(12) United States Patent
Schmier, II et al.

(10) Patent No.: US 9,759,617 B2
(45) Date of Patent: Sep. 12, 2017

(54) TOOL WITH OVER PRESSURE INDICATOR AND LOCKOUT

(71) Applicant: The Boeing Company, Chicago, IL (US)

(72) Inventors: Mark A. Schmier, II, Mesa, AZ (US); Curtis R. Estevo, Mesa, AZ (US); David J. Delany, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 279 days.

(21) Appl. No.: 14/683,369

(22) Filed: Apr. 10, 2015

(65) Prior Publication Data

US 2016/0299015 A1    Oct. 13, 2016

(51) Int. Cl.
| | |
|---|---|
| *G01L 1/06* | (2006.01) |
| *B25B 5/16* | (2006.01) |
| *B25B 5/12* | (2006.01) |
| *B25B 5/06* | (2006.01) |
| *B25B 1/24* | (2006.01) |
| *B25B 5/04* | (2006.01) |

(52) U.S. Cl.
CPC .............. *G01L 1/06* (2013.01); *B25B 1/2405* (2013.01); *B25B 5/04* (2013.01); *B25B 5/06* (2013.01); *B25B 5/125* (2013.01); *B25B 5/16* (2013.01); *B25B 5/163* (2013.01)

(58) Field of Classification Search
CPC ........... B25B 1/2405; B25B 5/06; B25B 5/10; B25B 5/163; B25B 27/24; B25B 27/306; B25B 27/30; B25B 5/125; B25B 5/19; B25B 5/16; B25B 5/04; G01L 1/06

USPC .............. 269/224, 249, 254 CS, 228, 143, 6
See application file for complete search history.

(56) References Cited

U.S. PATENT DOCUMENTS

| | | | | |
|---|---|---|---|---|
| 2,502,804 A | * | 4/1950 | Spencer ................. | B25B 5/163 269/223 |
| 2,715,925 A | * | 8/1955 | Porters ..................... | B25B 5/06 269/188 |
| 2,821,877 A | * | 2/1958 | Swanson ............ | H01R 43/0427 140/117 |
| 2,867,003 A | * | 1/1959 | Stiles .................... | B29C 33/202 249/82 |
| 2,975,630 A | | 3/1961 | Michel | |
| 3,070,380 A | * | 12/1962 | Holmberg ............. | B23B 31/202 24/115 M |
| 4,034,971 A | * | 7/1977 | Tsuyama ............ | B23K 37/0435 269/249 |
| 4,552,042 A | * | 11/1985 | Beymer .................... | B25B 1/10 81/473 |
| 5,568,916 A | * | 10/1996 | Gibbons ................. | B25B 5/101 269/174 |

(Continued)

FOREIGN PATENT DOCUMENTS

JP         2014228141 A  * 12/2014

*Primary Examiner* — Larry E Waggle, Jr.
*Assistant Examiner* — Mahdi H Nejad
(74) *Attorney, Agent, or Firm* — Joseph M. Rolnicki; Evans & Dixon, L.L.C.

(57) ABSTRACT

A tool is used in securing or clamping two or more workpieces together provides a visual indication to a user of the tool of an acceptable range of compression pressure exerted by the tool on a work surface of the workpieces and a visual indication of when a maximum compression pressure exerted by the tool on the work surface has been exceeded.

20 Claims, 12 Drawing Sheets

(56) References Cited

U.S. PATENT DOCUMENTS

| | | | | |
|---|---|---|---|---|
| 6,896,248 B1* | 5/2005 | Andulics | ............... | B25B 5/061 269/3 |
| 2012/0266422 A1* | 10/2012 | Galota | ............... | B25B 5/06 24/569 |
| 2012/0284995 A1* | 11/2012 | Andrews | ............... | B23P 11/02 29/456 |
| 2013/0241159 A1* | 9/2013 | Mateo | ............... | F16J 15/02 277/637 |
| 2016/0138669 A1* | 5/2016 | Yang | ............... | F16F 13/005 254/133 R |
| 2016/0144487 A1* | 5/2016 | Ribic, Jr. | ............... | B25H 3/006 269/277 |
| 2016/0167201 A1* | 6/2016 | Saraie | ............... | B25B 1/2463 29/559 |

* cited by examiner

TOOL WITH OVER PRESSURE INDICATOR AND LOCKOUT

FIELD

This disclosure pertains to a tool that exerts a compression force on a work surface of two or more workpieces being clamped together. More specifically, this disclosure pertains to a tool that is used in securing or clamping two or more workpieces together where the tool provides a visual indication to the user of the tool of an acceptable range of compression pressure exerted by the tool on a work surface of the workpieces and a visual indication of when a maximum compression pressure exerted by the tool on the work surface has been exceeded.

BACKGROUND

In the construction of structures where two or more workpieces are first temporarily secured together by a clamp, and later permanently secured together by a mechanical fastener, a weld, etc., it is often necessary that the clamp temporarily securing the workpieces together not exert excessive compression pressure on the workpieces. This conventional clamping process relied on the individual clamping the workpieces together to ensure that an excessive amount of pressure was not used. However, because the perception of the compression pressure exerted on the workpieces can vary between individuals, inadvertently applying too much clamping force between lightweight, thin structures could cause damage to the workpieces such as permanent set or deformation in the surfaces of the workpieces during the manufacturing process.

SUMMARY

The tool of this disclosure, which includes an over pressure indicator and lockout, reduces or eliminates preloading conditions that arise from inadvertently applying too much clamping force to lightweight, thin workpieces when temporarily securing together the workpieces. The tool allows a user to apply a specified amount of compression pressure on a work surface and provides the user with a visual indication of the compression pressure being exerted on the work surface. Additionally, the tool provides a further visual indicator to the user of the tool when the compression pressure exerted on the work surface exceeds a maximum compression pressure. Still further, when the maximum compression pressure is exceeded, the tool locks, preventing additional compression pressure from being applied to the work surface and preventing the tool from being removed from the work surface by the user. An authorized person, such as an inspection specialist, is required to unlock the tool, to document the excessive compression force exerted on the work surface and to inspect the work surface for damage.

The tool of this disclosure may be used as part of a c-clamp, hand pliers, a squeeze action clamp or other equivalent type of tool that exerts a compression pressure on a work surface.

The tool comprises a body having a longitudinal length with opposite first and second end surfaces. An interior bore extends longitudinally through the body. Additionally, a lock passage extends laterally through a portion of the body from a lock passage end surface in the body, across the interior bore and to a lock passage opening in a side surface of the body.

A cap is attached to the side surface of the body covering over the lock passage opening in the side surface. The cap is a tamper evident barrier that requires breaking the cap to remove the cap from the side surface of the body and provide access to the lock passage through the lock passage opening.

A lock bolt is positioned in the lock passage of the body. The lock bolt is received in the lock passage for reciprocating movements through the lock passage between the lock passage end surface and the lock passage opening.

A lock spring is provided in the lock passage between the lock passage end surface and the lock bolt. The lock spring biases the lock bolt through the lock passage toward the interior bore of the body.

A shaft having a longitudinal length is positioned in the interior bore of the body. The shaft has a shaft first end surface and a shaft second end surface at opposite ends of the shaft length. The shaft first end surface is configured for engaging against and exerting a compression pressure on a work surface. The shaft is received in the interior bore of the body for reciprocating movements of the shaft in a first direction of the shaft relative to the body where the shaft first end surface moves away from the body first end surface, and in a second direction of the shaft relative to the body where the shaft first end surface moves toward the body first end surface. The first direction and the second direction are opposite directions. The shaft has an indent in an intermediate portion of the shaft. A first visual indicator is provided on the shaft between the indent in the shaft and the shaft second end surface. A second visual indicator is provided on the shaft adjacent the first visual indicator and between the indent and the first visual indicator.

A coil spring is mounted on the shaft between an abutment on the shaft and the body first end surface. The coil spring biases the shaft in the first direction to a first position of the shaft relative to the body. When the shaft is in the first position and the shaft first end surface is not exerting a compression pressure on a work surface, the first visual indicator and the second visual indicator on the shaft are positioned inside the interior bore of the body and are not visible exterior of the body.

When the shaft first end surface is engaged against a work surface of a workpiece and the shaft first end surface exerts a compression pressure on the work surface that compresses the coil spring but is less than the maximum compression pressure, the shaft moves in the second direction relative to the body. The first visual indicator on the shaft is also moved in the second direction relative to the body and eventually exits the body interior bore and becomes visible exterior of the body. The second visual indicator remains inside the body interior bore. The first visual indicator appearing outside of the body interior bore provides a visual indication to a user of the tool that the compression pressure exerted by the shaft first end surface on a work surface has not exceeded the maximal compression pressure.

When the shaft first end surface exerts a further pressure against the work surface exceeding the maximum pressure and further compressing the spring, the shaft moves further in the second direction relative to the body. The first visual indicator and the second visual indicator are moved further in the second direction relative to the body and both become visible exterior of the body. This provides a visual indication to the user of the tool that the maximum compression pressure exerted by the tool has been exceeded. In this position of the shaft relative to the body the indent in the shaft aligns with the lock passage of the body. This enables the lock spring to push the lock bolt through the lock passage and into the indent in the shaft where the lock bolt locks the shaft against further movement in both the first direction relative to the body and the second direction relative to the body. This prevents the shaft first end surface from exerting any further compression pressure against the work surface. It also prevents removing the tool from the work surface.

To unlock the shaft locked to the body and remove the tool from the workpiece, it is necessary to break the cap to expose the lock bolt in its locked position in the intent of the shaft. Breaking the cap provides evidence of tampering with the tool. With the cap broken and removed from the body, access is provided to the lock bolt in its locked position in the shaft intend. The lock bolt can be engaged by an unlocking tool and moved through the lock passage against the bias of the lock spring toward the end surface of the lock passage. This disengages the lock bolt from the shaft indent and enables the shaft to move in the first direction under the bias of the coil spring on the shaft. This prepares the tool for further use.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Further features of the tool with an over pressure indicator and lockout are set forth in the following detailed description and in the drawing figures.

DESCRIPTION

Figure 1:
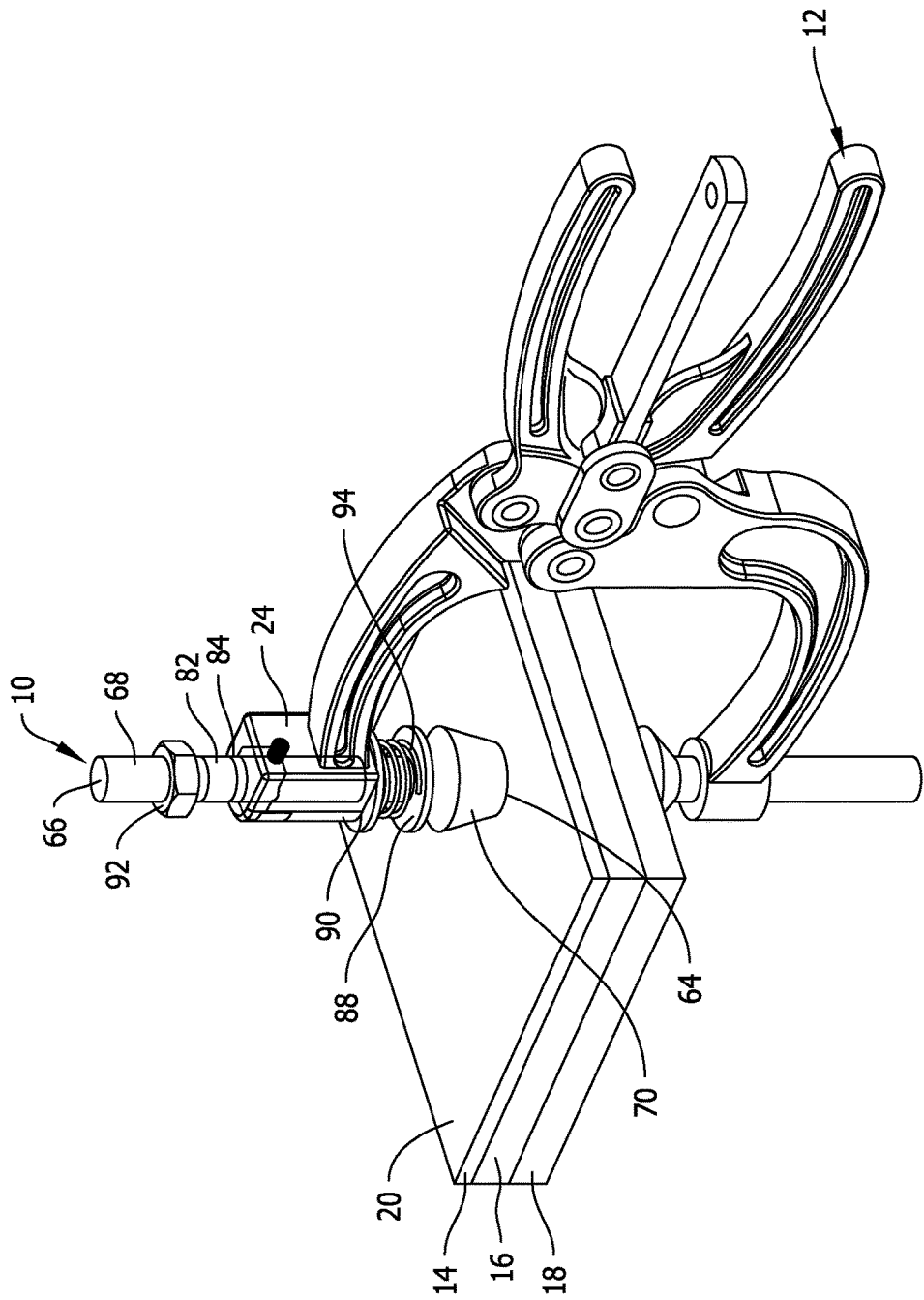
FIG. 1 is a representation of a perspective view of the tool of this disclosure and a manually operated squeeze action clamp.

FIG. 1 shows a representation of the tool with an over pressure indicator and a lock out 10 of this disclosure. The tool is shown in FIG. 1 as part of a manually operated squeeze action clamp 12. As represented in FIG. 1, the tool 10 is used to clamp together several workpieces 14, 16, 18 and exert a compression pressure on a work surface 20 of the workpieces. The clamp 12 represented in FIG. 1 is only one example of the tool 10 employed as part of a device that exerts a compression pressure on a work surface. The tool 10 may be used in any operative environment where it is desired to exert a compression pressure on a work surface while providing a visual indication that the compression pressure is within an acceptable range and providing a visual indication of when the compression pressure has exceeded a maximum compression pressure. The tool 10 is not to be limited to the operative environment represented in FIG. 1.

Figure 2:
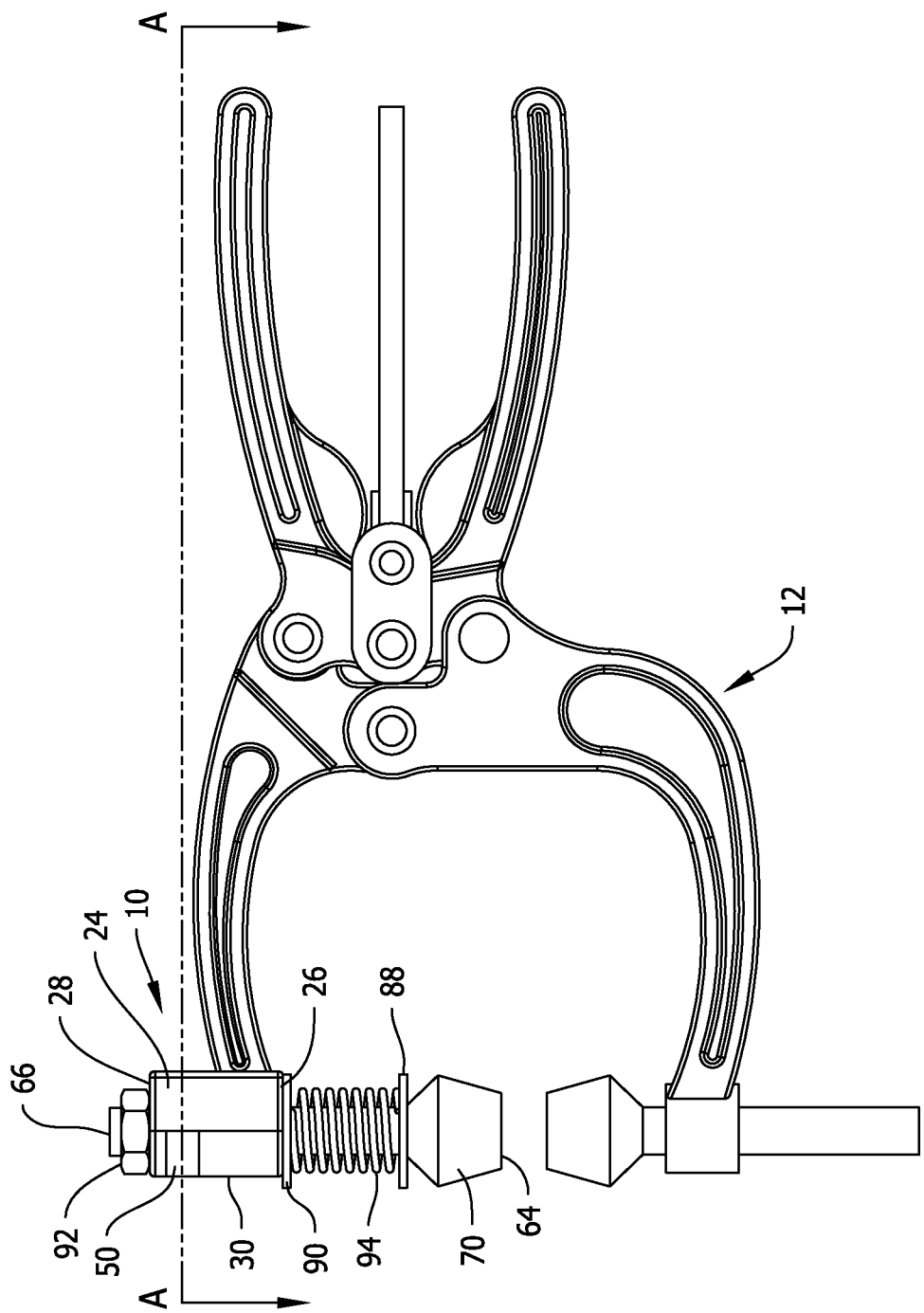
FIG. 2 is a side elevation view of the tool.
Figure 3:
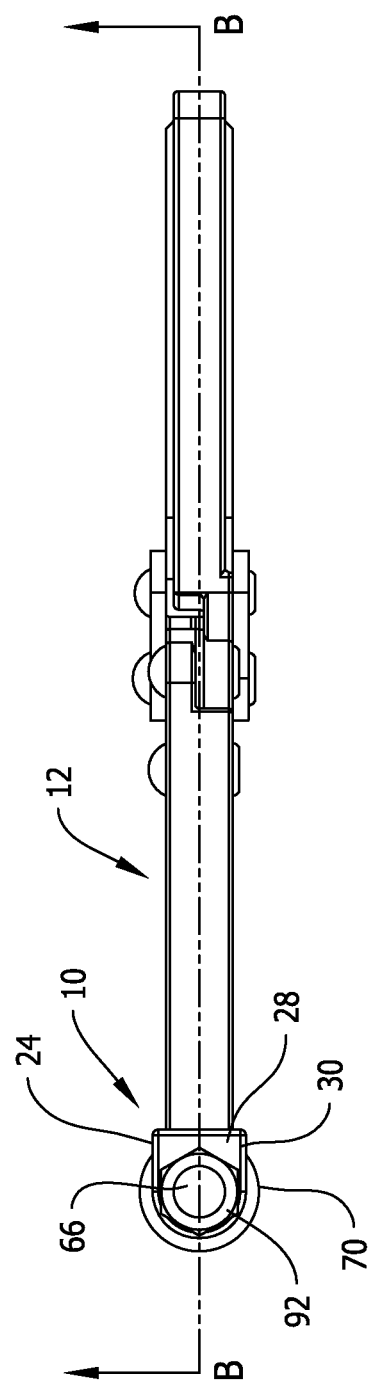
FIG. 3 is a top plan view of the tool as shown in FIG. 2.
Figure 4:
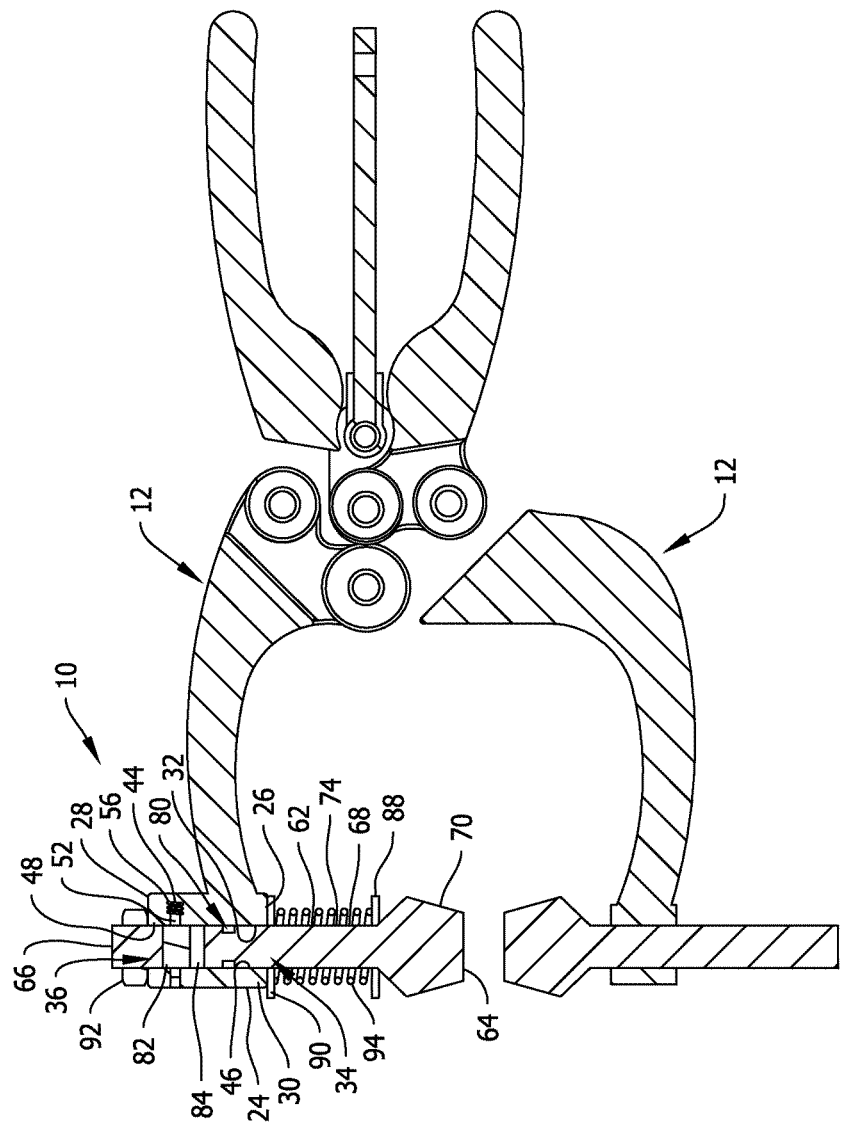
FIG. 4 is a sectioned view of the tool along lines B-B shown in FIG. 3.
Figure 5:
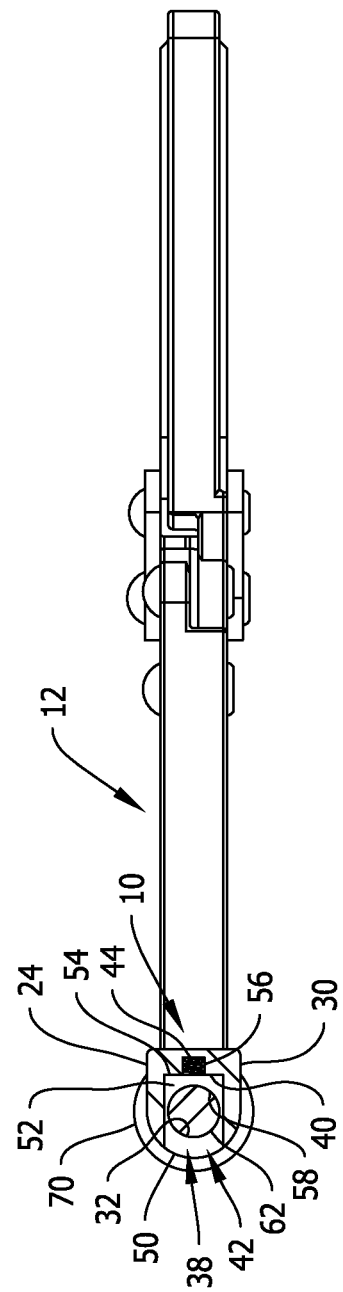
FIG. 5 is a top sectioned view of the tool along the line A-A in FIG. 2.
Figure 6:
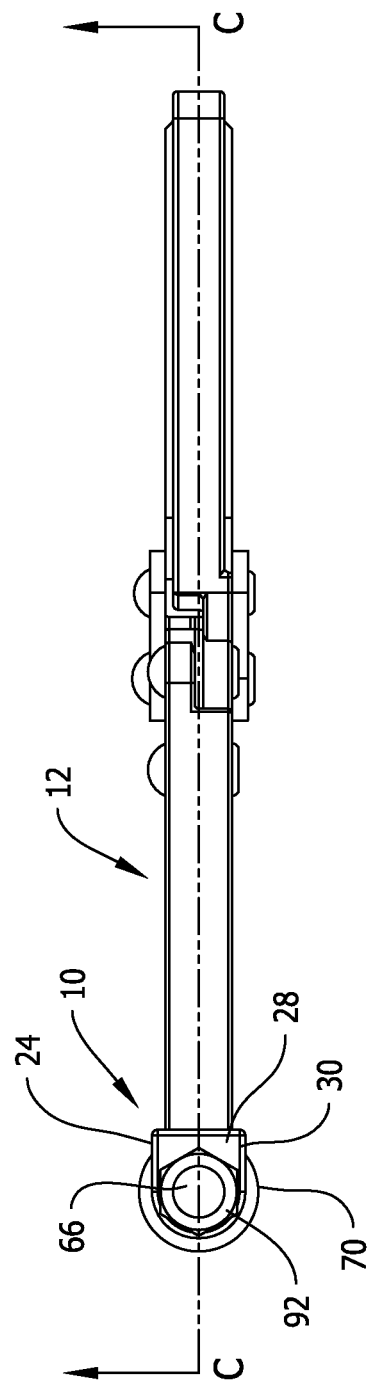
FIG. 6 is a top plan view of the tool similar to FIG. 3, but with the cross-section line C-C.
Figure 11:
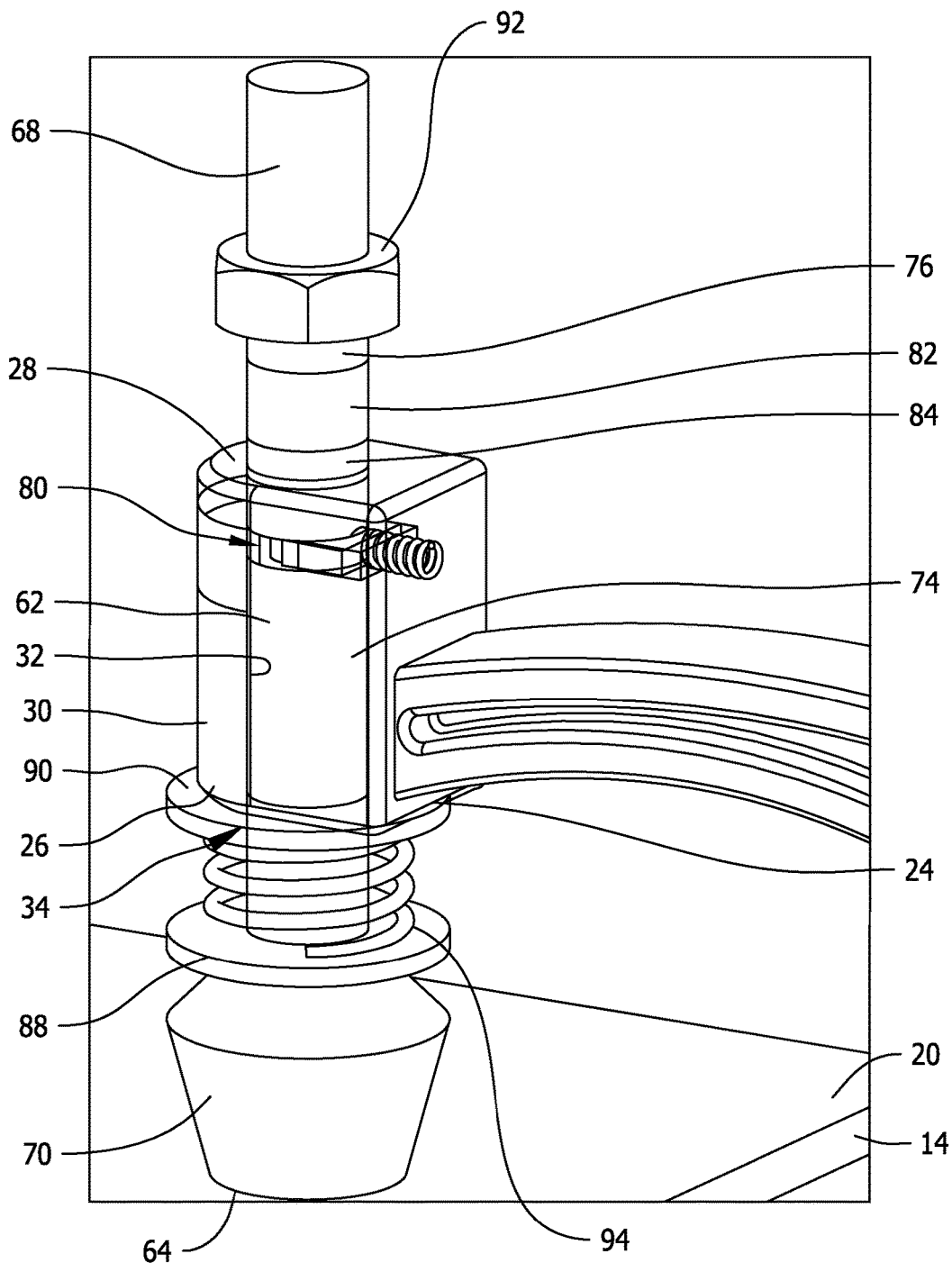
FIG. 11 is a representation of a perspective view of the tool of this disclosure removed from the clamp of FIG. 1 and in the locked condition of the tool.
Figure 12:
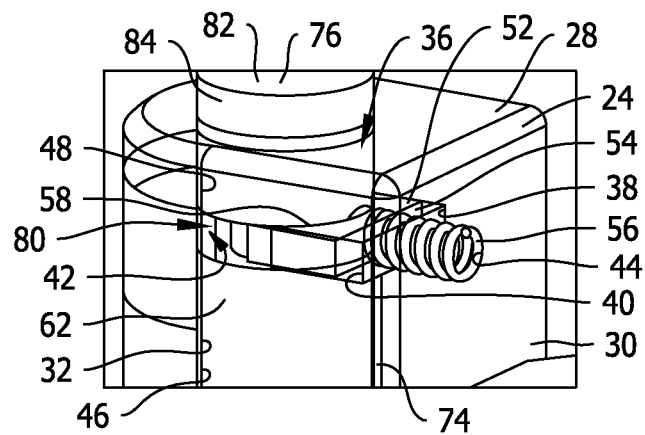
FIG. 12 is an enlarged partial view of a portion of the tool shown in FIG. 11.
Figure 13:
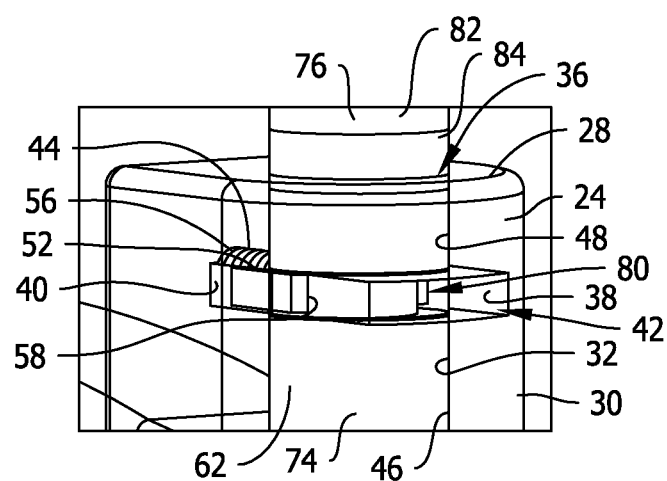
FIG. 13 is an enlarged partial view of the opposite side of the portion of the tool represented in FIG. 12.

FIG. 2 is a side elevation view of the tool 10 and the clamp 12 removed from the workpieces 14, 16, 18. FIG. 3 is a top plan view of the tool 10 and clamp 12. FIG. 4 is a side sectioned view of the tool 10 and clamp 12 along the line B-B in FIG. 3. FIG. 5 is a top sectioned view of the tool 10 and clamp 12 along the line A-A in FIG. 2. FIG. 11 is a representation of an enlarged perspective view of the tool 10. Referring to FIGS. 1-5 and 11, the tool 10 comprises a body 24 having a longitudinal length between a body first end surface 26 and a body second end surface 28 at opposite ends of the longitudinal length. A side surface 30 of the body extends along the body length between the body first end surface 26 and the body second end surface 28. The body 24 of the tool 10 as well as the other component parts of the tool 10 to be described can be constructed of any materials that provide the tool 10 with sufficient strength for its intended function. An interior bore 32 extends longitudinally through the body 24. The interior bore 32 has a circular cross-section in the illustrated embodiment. The interior bore 32 could have other equivalent cross-section configurations. The interior bore 32 emerges from the body 24 through a first bore opening 34 in the body first end surface 26 and through a second bore opening 36 in the body second end surface 28. A lock passage 38 extends laterally through a portion of the body 24. Details of the lock passage 38 are shown in the representations of FIGS. 12 and 13. In the illustrated embodiment of the tool 10, the lock passage 38 has a general rectangular cross-section configuration. Other equivalent cross-section configurations of the lock passage 38 could be employed. The lock passage 38 extends laterally from a rectangular end surface 40 inside the body 24, through the body 24 and across the interior bore 32 to a lock passage opening 42 in the side surface 30 of the body 24. The lock passage 38 also communicates with a cylindrical hole 44 recessed into the lock passage end surface 40.

As represented in FIGS. 5, 12 and 13, the lock passage 38 extending laterally through the interior bore 32 of the body 24 divides the interior bore 32 into a first interior bore portion 46 that extends longitudinally through the body 24 from the lock passage 38 to the first bore opening 34 in the body first end surface 26 and a second interior bore portion 48 that extends longitudinally from the lock passage 38 through the body to the second bore opening 36 in the body second end surface 28.

A cap 50 is attached to the side surface 30 of the body 24. The cap 50 covers over the lock passage opening 42 in the side surface 30 closing off the lock passage 38 from the exterior of the body 24. The cap 50 is a tamper-evident barrier that requires breaking the cap 50 to remove the cap 50 from the side surface 30 of the body and provide access to the lock passage 38 through the lock passage opening 42.

A lock bolt 52 is positioned in the lock passage 38. The lock bolt 52 has a general rectangular cross-section configuration that is dimensioned to easily slide through the lock passage 38. The lock bolt 52 has a generally rectangular end wall 54 that opposes the end surface 40 of the lock passage 38. A lock spring 56 is positioned in the hole 44 recessed into the lock passage end surface 40 and engages against the lock bolt end wall 54. In the illustrated embodiment the lock spring 56 is a coil spring. However, other equivalent types of springs could be employed as the lock spring 56. The lock spring 56 biases the lock bolt 52 through the lock passage 38 from the lock passage end surface 40 toward the interior bore 32 of the body 24 and the lock passage opening 42 in the side surface 30 of the body 24. Opposite the rectangular end wall 54 the lock bolt 52 has a curved end wall 58 with a general semi-circular configuration. The curved end wall 58 is dimensioned to engage in sliding friction engagement with a side surface of a shaft to be described.

The shaft 62 mentioned earlier is represented in FIGS. 1 and 2. The shaft 62 has a longitudinal length that extends between a shaft first end surface 64 and a shaft second end surface 66 at opposite ends of the shaft length. The shaft has a generally cylindrical exterior surface 68 that extends along the longitudinal length of the shaft between the shaft first end surface 64 and the shaft second end surface 66. As represented in FIGS. 1-10, the shaft 62 is formed with an enlarged head 70 adjacent the shaft first end surface 64. The enlarged head 70 configures the shaft first end surface 64 for engaging against and exerting a compression pressure on a work surface. Adjacent the enlarged head 70, the shaft 62 has a first exterior surface portion 74 having a general cylindrical configuration. The first exterior surface portion 74 is received in the first interior bore portion 46 of the interior bore 32 for reciprocating movements in opposite first and second directions relative to the body 24. The first exterior surface portion 74 of the shaft 62 also has a configuration that engages in sliding engagement with the lock bolt curved end wall 58.

The shaft exterior surface 68 also has a second exterior surface portion 76 with a general cylindrical configuration. The second exterior surface portion 76 is received in the second interior bore portion 48 of the interior bore 32 for reciprocating movements in the opposite first and second directions relative to the body 24. The first direction and the second direction are opposite directions. The shaft first exterior surface portion 74 extends longitudinally from the first bore opening 34 in the body first end surface 26 to the shaft enlarged head 70. The shaft second exterior surface portion 76 extends from the second bore opening 36 in the body second end surface 28 to the shaft second end surface 66. When the shaft 62 moves in the first direction relative to the body 24 the shaft first end surface 64 moves away from the body first end surface 26 and the shaft second end surface 66 moves toward the body second end surface 28. When the shaft 62 moves in the second direction relative to the body 24 the shaft first end surface 64 moves toward the body first end surface 26 and the shaft second end surface 66 moves away from the body second end surface 28.

The shaft 62 has an indent 80 formed in an intermediate portion of the shaft. As represented in FIGS. 11, 12 and 13, the indent 80 has the configuration of a cylindrical groove or notch formed in the shaft exterior surface 68 around the shaft exterior surface. Other equivalent configurations of the indent 80 could be employed. The indent 80 extends laterally into the shaft exterior surface 68 between the shaft first exterior surface portion 74 and the shaft second exterior surface portion 76. A first visual indicator 82 is provided on the shaft second exterior surface portion 76. The first visual indicator 82 could be a colored band, for example green on the shaft exterior surface. As represented in FIG. 11, the first visual indicator 82 is positioned between the indent 80 in the shaft 62 and the shaft second end surface 66. A second visual indicator 84 is provided on the shaft second exterior surface portion 76. The second visual indicator 84 could be a colored band, for example red, on the shaft exterior surface. Other equivalent types of indicators could also be employed. The second visual indicator 84 is positioned adjacent the indent 80 and between the first visual indicator 82 and the indent 80.

A first abutment 88 is positioned on the shaft first exterior surface portion 74. As represented in FIGS. 1, 2, 4 and 7-9, the first abutment 88 is formed as an annular ring that is positioned on the shaft first exterior surface portion 74 adjacent the shaft enlarged head 70. In an alternate embodiment of the tool 10, the shaft enlarged head 70 could function as the first abutment.

A second abutment 90 is also positioned on the shaft first exterior surface portion 74. Like the first abutment 88, the second abutment 90 is also formed as an annular ring that is positioned on the shaft first exterior surface portion 74 adjacent the body first end surface 26. In an alternate embodiment of the tool 10, the body first end surface 26 could function as the second abutment.

A third abutment 92 is positioned on the shaft second exterior surface portion 76. As represented in FIGS. 1 and 2, the third abutment 92 has the configuration of a hex nut that is screw threaded on the shaft second exterior surface portion 76. The third abutment 92 is positioned on the shaft second exterior surface portion 76 between the body second end surface 28 and the shaft second end surface 66.

A spring 94 is mounted on the shaft first exterior surface portion 74 between the first abutment 88 and the second abutment 90. In the illustrated embodiment the spring 94 is a coil spring. Other equivalent types of springs may be employed. The spring 94 is shown in FIGS. 1, 2, 4 and 7-9 engaging between the first abutment 88 and the second abutment 90 to bias the shaft 62 in the first direction relative to the body 24. Equivalently, the first abutment 88 and second abutment 90 could be removed and the spring 94 could be positioned between the shaft enlarged head 70 and the body first end surface 26.

As stated earlier, the spring 94 biases the shaft 62 in the first direction to a first position of the shaft 62 relative to the body 24. The third abutment 92 on the shaft second exterior surface portion 76 engages against the body second end surface 28 to hold the shaft 62 in its first position relative to the body. This is represented in FIG. 2. When the shaft 62 is in the first position and the shaft first end surface 64 is not exerting a compression pressure on a work surface, the first visual indicator 82 and the second visual indicator 84 on the shaft second exterior surface portion 76 are positioned inside the second interior bore portion 48 of the body interior bore 32 and are not visible exterior of the body. This is represented in FIG. 4.

In use of the tool 10, the tool 10 exerts a compression pressure on a work surface up to a maximum compression pressure, and provides a visual indication to a user of a tool of when the compression pressure exerted on the work surface is acceptable and of when the maximum compression pressure exerted on the work surface has been exceeded.

Figure 7:
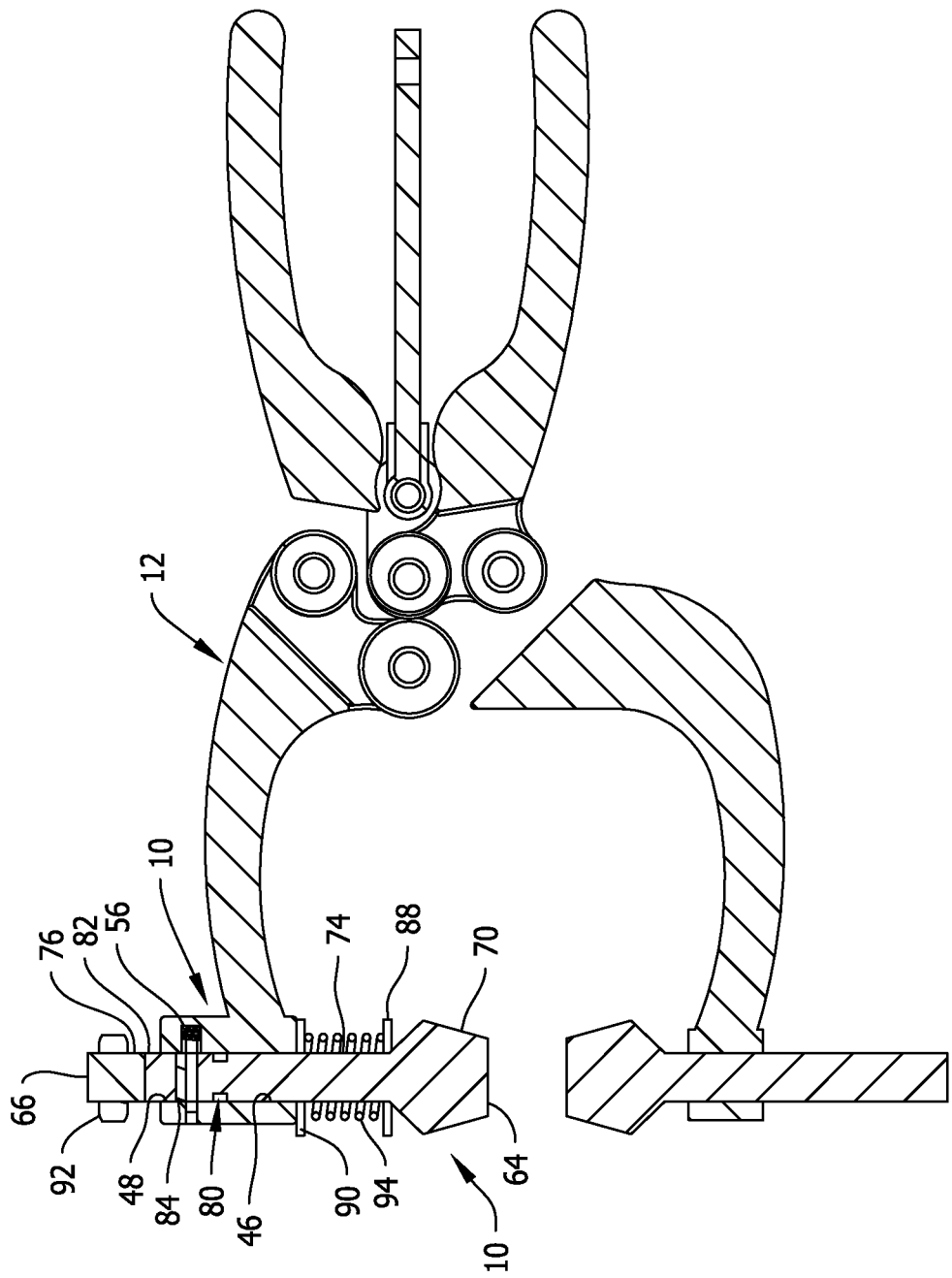
FIG. 7 is a side sectioned view of the tool along the line C-C shown in FIG. 6 showing the tool in a first operative condition.
Figure 8:
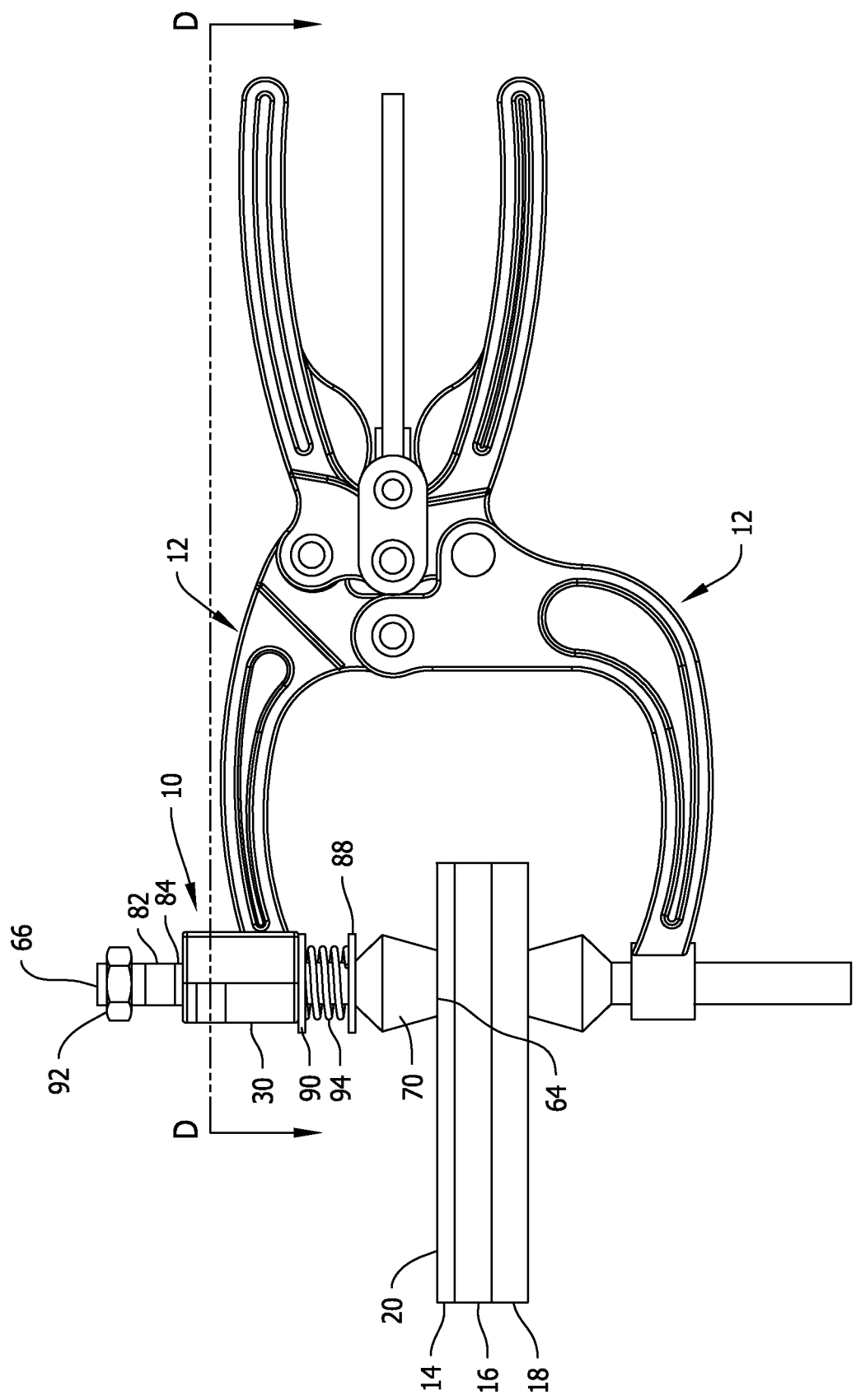
FIG. 8 is a side elevation view of the tool showing the tool in the locked condition.
Figure 9:
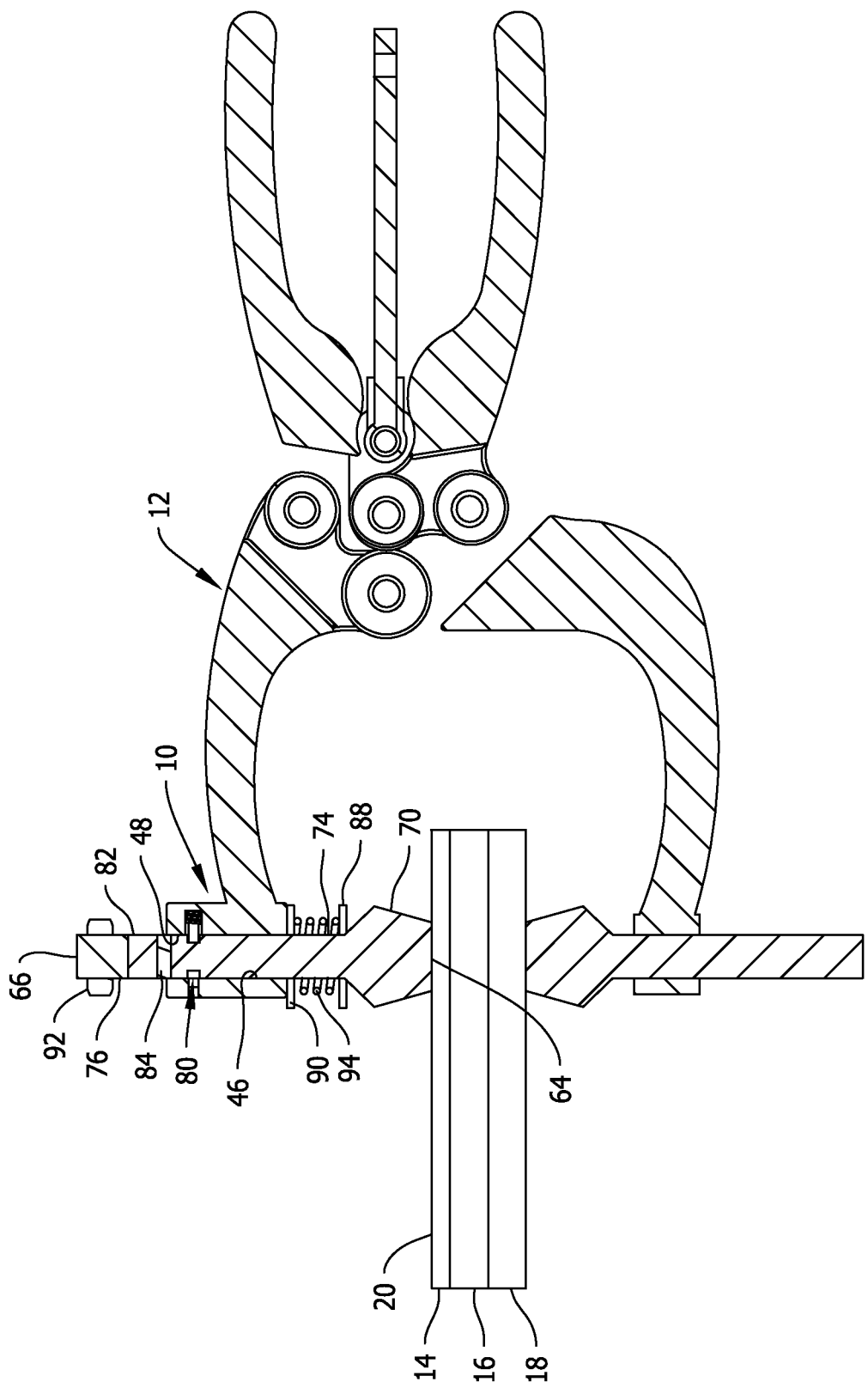
FIG. 9 is a side sectioned view of the tool in the locked condition.
Figure 10:
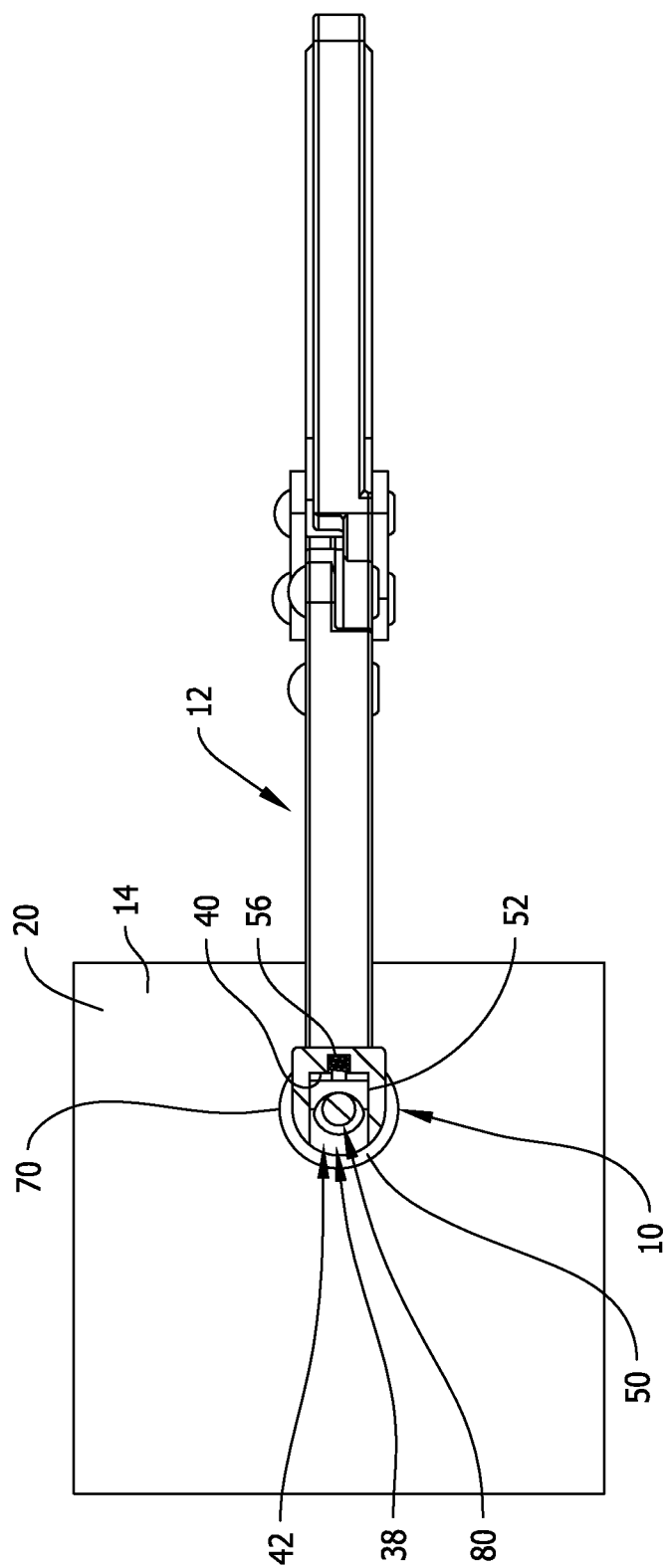
FIG. 10 is a top sectioned view of the tool along the line D-D shown in FIG. 8.

In use of the tool 10 the shaft first end surface 64 is engaged against a work surface 20 of a workpiece 14 such as those represented in FIGS. 1 and 8-11. The shaft first end surface 64 exerts a compression pressure on the work surface 20 which in turn exerts a compression pressure on the shaft first end surface 64 that compresses the spring 94, but is less than the maximum compression pressure. The pressure exerted by the work surface 20 on the shaft first end surface 64 moves the shaft 62 in the second direction relative to the body 24. The first visual indicator 82 on the shaft 62 is also moved in the second direction relative to the body 24. The first visual indicator 82 eventually emerges out of the body interior bore 32 at the second bore opening 36 where the first visual indicator 82 is visible exterior of the body. The second visual indicator 84 remains inside the body interior bore 32. The first visual indicator 82 appearing outside the body interior bore 32 provides a visual indication to a user of the tool 10 that the compression pressure exerted by the shaft first end surface 64 on the work surface 20 is within an acceptable range and has not exceeded the maximum compression pressure. This is represented in FIG. 7.

On further application of force by the tool 10 on the work surface 20, the shaft first end surface 64 exerts a further compression pressure against the work surface 20 exceeding the maximum pressure and further compressing the spring 94. The shaft 62 moves further in the second direction relative to the body 24. The first visual indicator 82 and the second visual indicator 84 are moved further in the second direction relative to the body 24 and out of the interior bore 32 of the body through the second bore opening 36. The first visual indicator 82 and the second visual indicator 84 become visible exterior of the body 24. This provides a visual indication to the user of the tool 10 that the maximum compression pressure exerted by the tool 10 on the work surface 20 has been exceeded. This is represented in FIGS. 1, 8, 9 and 11-13. In this position of the shaft 62 relative to the body 24 the indent 80 in the shaft aligns laterally with the lock passage 38 of the body 24. This enables the lock spring 56 to push the lock bolt 52 through the lock passage 38 and into the indent 80 in the shaft 62 where the lock bolt 52 locks the shaft 62 against further movement in both the first direction relative to the body 24 and the second direction relative to the body 24. This prevents the shaft first end surface 64 from exerting any further compression pressure against the work surface 20. It also prevents removing the tool 10 from the work surface 20 and the workpieces 14, 16, 18. This is represented in FIGS. 9-13.

To unlock the shaft 62 locked to the body 24 and remove the tool 10 from the workpieces 14, 16, 18, it is necessary to break the cap 50 to expose the lock bolt 52 in its locked position in the indent 80 of the shaft. Breaking the cap 50 provides evidence of tampering with the tool 10. With the cap 50 broken and removed from the side surface 30 of the body 24, access is provided to the lock bolt 52 in its locked position in the shaft indent 80 inside the lock passage 38. The lock bolt 52 can be engaged by an unlocking key inserted through the lock passage opening. Using the unlocking key to push against the lock bolt 52 moves the lock bolt 52 through the lock passage 38 against the bias of the lock spring 56 toward the end surface 40 of the lock passage 38. This disengages the lock bolt 52 from the shaft indent 80 and enables the shaft 62 to move in the first direction under the bias of the spring 94. This enables the tool 10 to be removed from the workpieces 14, 16, 18 and prepares the tool for further use.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A tool for exerting a compression pressure on a work surface, the tool comprising:
   a body having a longitudinal length with opposite first and second ends and a lateral width, an interior bore extending through the longitudinal length of the body and a lock passage extending laterally from an end surface of the lock passage inside the body, through the body and across the interior bore to a lock passage opening in a side surface of the body;
   a lock bolt in the lock passage of the body, the lock bolt having an end wall that opposes the end surface of the lock passage;
   a lock spring in the lock passage between the end surface of the lock passage and the end wall of the lock bolt, the lock spring biasing the lock bolt laterally through the lock passage from the end surface of the lock passage toward the interior bore of the body;
   a shaft extending through the interior bore of the body, the shaft being moveable through the interior bore between a first position of the shaft relative to the body and a second position of the shaft relative to the body, the shaft having a first portion extending from the first end of the body and the shaft having a second portion extending from the second end of the body, the shaft having an indent in the shaft between the first portion of the shaft and the second portion of the shaft, the shaft having first and second visual indicators on the second portion of the shaft adjacent the indent in the shaft and with the second visual indicator being positioned on the second portion of the shaft between the first visual indicator and the indent in the shaft, the first and second visual indicators being positioned inside the interior bore of the body when the shaft is in the first position of the shaft relative to the body;
   a spring biasing the shaft toward the first position of the shaft relative to the body, wherein with there being no said compression pressure exerted by the first portion of the shaft on the work surface, the spring biases the shaft to the first position of the shaft relative to the body;
   wherein with the first portion of the shaft exerting the compression pressure on the work surface, the compression pressure resists the spring biasing the shaft to the first position of the shaft relative to the body and moves the shaft toward the second position of the shaft relative to the body resulting in the first visual indicator to be visible from an exterior of the body; and,
   wherein with the first portion of the shaft exerting a further compression pressure on the work surface that exceeds a maximum compression pressure, an increased compression pressure further resists the spring biasing the shaft toward the first position of the shaft relative to the body and moves the shaft to the second position of the shaft relative to the body where the second visual indicator is visible from the exterior of the body and the indent in the shaft is aligned with the lock passage in the body, enabling the lock spring to push the lock bolt laterally through the lock passage and into the indent in the shaft where the lock bolt locks the shaft in the second position of the shaft relative to the body and where the lock bolt locks the shaft against further movement in both a first direction relative to the body and a second direction relative to the body.

2. The tool of claim 1, further comprising:
   the first visual indicator is positioned on the second portion of the shaft relative to the body to emerge from the interior bore of the body at the second end of the body and be visible from the exterior of the body in response to the shaft being moved toward the second position of the shaft relative to the body.

3. The tool of claim 2, further comprising:
the first visual indicator being positioned on the second portion of the shaft and the second visual indicator being positioned on the second portion of the shaft, wherein when the shaft is moved toward the second positon of the shaft relative to the body causing the first visual indicator to be visible from the exterior of the body the second visual indicator is positioned inside the interior bore of the body and is not visible from the exterior of the body.

4. The tool of claim 1, further comprising:
the spring biasing the shaft is a coil spring on the first portion of the shaft and acting against the first portion of the shaft and the first end of the body; and,
an abutment on the second portion of the shaft, the abutment being positioned on the second portion of the shaft where the abutment engages against the second end of the body when the coil spring biases the shaft to the first position of the shaft relative to the body to hold the shaft in the first position of the shaft relative to the body.

5. The tool of claim 4, further comprising:
the coil spring positioned on the first portion of the shaft engages with the first portion of the shaft and the first end of the body.

6. The tool of claim 1, further comprising:
the lock passage opening providing access to the lock bolt with the lock bolt biased into the indent in the shaft to enable disengaging the lock bolt from the indent in the shaft.

7. The tool of claim 6, further comprising:
a cap attached to the body, the cap covering over the lock passage opening in the body,
the cap being removable from the body to provide access to the lock bolt in the indent in the shaft.

8. The tool of claim 7, further comprising:
the cap being a tamper evident barrier that requires breaking the cap to remove the cap from the lock passage opening in the body and access the lock bolt biased into the indent in the shaft.

9. The tool of claim 1, further comprising:
the tool being a part of a manually operated clamp.

10. A tool for exerting a compression pressure on a work surface, the tool comprising:
a body having a longitudinal length and a lateral width, a body first end surface and a body second end surface at opposite ends of the longitudinal length of the body, an interior bore extending through the longitudinal length of the body and through the body first end surface and the body second end surface, and a lock passage extending laterally from an end surface of the lock passage inside the body, through the body and across the interior bore to a lock passage opening in a side surface of the body;
a lock bolt in the lock passage of the body, the lock bolt having an end wall that opposeses the end surface of the lock passage;
a lock spring in the lock passage between the end surface of the lock passage and the end wall of the lock bolt, the lock spring biasing the lock bolt laterally through the lock passage from the end surface of the lock passage toward the interior bore of the body;
a shaft having a length that extends through the interior bore of the body, a shaft first end surface and a shaft second end surface at opposite ends of the length of the shaft, the shaft having an exterior surface that extends along the length of the shaft with a shaft first exterior surface portion that extends from the body first end surface to the shaft first end surface and a shaft second exterior surface portion that extends from the body second end surface to the shaft second end surface, the shaft being received in the interior bore of the body for reciprocating movements of the shaft in a first direction of the shaft relative to the body where the shaft first end surface moves away from the body first end surface and in a second direction of the shaft relative to the body where the shaft first end surface moves toward the body first end surface, the first direction and the second direction being opposite directions, the shaft having an indent in the shaft between the shaft first exterior surface portion and the shaft second exterior surface portion, a first visual indicator on the shaft second exterior surface portion, a second visual indicator on the shaft second exterior surface portion, the second visual indicator being positioned on the shaft second exterior surface portion between the indent in the shaft and the first visual indicator;
a spring on the shaft, the spring biasing the shaft in the first direction relative to the body, the spring biasing the shaft to a first position of the shaft relative to the body when the shaft first end surface is not exerting the compression pressure on the work surface, the first visual indicator and the second visual indicator being positioned on the shaft second exterior surface portion where the first visual indicator and the second visual indicator are positioned inside the interior bore of the body and are not visible from an exterior of the body when the shaft is in the first position of the shaft relative to the body;
the first visual indicator and the second visual indicator being positioned on the shaft second exterior surface portion, wherein when the shaft first end surface exerts a first pressure on the work surface that is less than a maximum compression pressure, the first pressure resists the bias of the spring and causes the shaft to move in the second direction relative to the body where the first visual indicator is moved in the second direction and becomes visible from the exterior of the body and the second visual indicator is not visible from the exterior of the body; and,
wherein when the shaft first end surface exerts a second pressure on the work surface that is more than the maximum compression pressure, the second pressure further resists the bias of the spring and causes the shaft to move further in the second direction relative to the body where the second visual indicator is moved in the second direction and becomes visible from the exterior of the body and the indent in the shaft aligns with the lock passage enabling the lock spring to push the lock bolt laterally through the lock passage and into the indent in the shaft where the lock bolt locks the shaft in the second position of the shaft relative to the body and where the lock bolt locks the shaft against further movement in both the first direction relative to the body and the second direction relative to the body.

11. The tool of claim 10, further comprising:
the first visual indicator is positioned on the shaft second exterior surface relative to the body to emerge from the interior bore of the body at the second end of the body and be visible from the exterior of the body in response to the shaft being moved toward the second position of the shaft relative to the body.

12. The tool of claim 11, further comprising:
the first visual indicator being positioned on the shaft second exterior surface portion and the second visual indicator being positioned on the shaft second exterior surface portion, wherein when the shaft is moved toward the second position of the shaft relative to the body causing the first visual indicator to be visible from the exterior of the body the second visual indicator is positioned inside the interior bore of the body and is not visible from the exterior of the body.

13. The tool of claim 10, further comprising:
the spring biasing the shaft is a coil spring on the shaft first exterior surface portion and acting against the shaft first exterior surface portion and the body first end; and,
an abutment on the shaft second exterior surface portion, the abutment being positioned on the shaft second exterior surface portion where the abutment engages against the body second end surface when the coil spring biases the shaft to the first position of the shaft relative to the body to hold the shaft in the first position of the shaft relative to the body.

14. The tool of claim 13, further comprising:
the coil spring positioned on the shaft first exterior surface portion engages with the shaft first exterior surface portion and the body first end surface.

15. The tool of claim 10, further comprising:
the lock passage opening providing access to the lock bolt with the lock bolt biased into the indent in the shaft to enable disengaging the lock bolt from the indent in the shaft.

16. The tool of claim 15, further comprising:
a cap attached to the body, the cap covering over the lock passage opening in the body,
the cap being removable from the body to provide access to the lock bolt in the indent in the shaft.

17. The tool of claim 16, further comprising:
the cap being a tamper evident barrier that requires breaking the cap to remove the cap from the lock passage opening in the body and access the lock bolt biased into the indent in the shaft.

18. The tool of claim 10, further comprising:
the tool being a part of a manually operated clamp.

19. A method of exerting a compression pressure on a work surface up to a maximum compression pressure on the work surface and providing a visual indication of when the maximum compression pressure exerted on the work surface has been exceeded, the method comprising:
exerting the compression pressure on the work surface by a shaft of a tool causing the shaft to move through a body of the tool and causing a first visual indicator on the shaft to emerge from the body and be visible from an exterior of the body where the first visual indicator is indicative of the compression pressure exerted by the shaft on the work surface being less than the maximum compression pressure;
exerting a further compression pressure on the work surface by the shaft causing the shaft to move further through the body and causing a second visual indicator on the shaft to emerge from the body and be visible from the exterior of the body where the second visual indicator is indicative of the compression pressure exerted by the shaft on the work surface exceeding the maximum compression pressure; and,
locking the shaft to the body preventing any further movement of the shaft through and preventing the tool from being removed from the work surface.

20. The method of claim 19, further comprising:
when the further compression pressure exerted on the work surface by the shaft results in the second visual indicator being visible from the exterior of the body and the shaft locking to the body.

* * * * *